United States Patent [19]

Devic

[11] Patent Number: 5,085,880
[45] Date of Patent: Feb. 4, 1992

[54] PROCESS FOR THE PREPARATION OF BLEACHED VEGETABLE PULPS

[75] Inventor: Michel Devic, Sainte-Foy-les-Lyon, France

[73] Assignee: Atochem, Puteaux, France

[21] Appl. No.: 586,230

[22] Filed: Sep. 21, 1990

[30] Foreign Application Priority Data

Sep. 21, 1989 [FR] France ................................ 89 12616

[51] Int. Cl.$^5$ .............................................. A23L 1/277
[52] U.S. Cl. ................................... 426/253; 426/257; 426/258; 426/424; 426/429
[58] Field of Search ............... 426/253, 254, 256, 258, 426/804, 257, 424, 429

[56] References Cited

U.S. PATENT DOCUMENTS

| | | | |
|---|---|---|---|
| 2,478,043 | 8/1949 | Evans | 426/253 |
| 3,151,985 | 10/1964 | Fobes | 426/254 |
| 4,036,996 | 7/1977 | Chandler et al. | 426/254 |
| 4,241,093 | 12/1980 | Farag et al. | 426/258 |
| 4,844,924 | 7/1989 | Stanley | 426/258 |

FOREIGN PATENT DOCUMENTS 2237665  3/1973  Fed. Rep. of Germany .
2382866 10/1978  France .
 491607  6/1970  Switzerland .

OTHER PUBLICATIONS

Patent Abstracts of Japan, vol. 10, No. 276 (C-373) (2332), 9/10/86; & JP-A-61 96966 Tochigiken 5/15/86.
Patent Abstracts of Japan, vol. 12, No. 50 (C-476) (2897), 2/16/88; & JP-A-62 197 304 Nippon Peroxide Co. Ltd.-9/1/87.

*Primary Examiner*—Jeanette Hunter
*Attorney, Agent, or Firm*—Burns, Doane, Swecker & Mathis

[57] ABSTRACT

Preparation of bleached and dried vegetable pulps, wherein the bleaching by means of hydrogen peroxide is carried out simultaneously by the vaporization of the water of the pulp by means of a dry gaseous atmosphere circulating in contact with said pulp.

28 Claims, No Drawings

PROCESS FOR THE PREPARATION OF BLEACHED VEGETABLE PULPS

The present invention concerns a process for the preparation of bleached vegetable pulps, more particularly vegetable pulps for nutritional use bleached by means of hydrogen peroxide.

The vegetable pulps the bleaching of which is the object of the present invention are for example those of beets, sugar beets or others, citrus fruits, fruits such as apples, peaches, pears, apricots, oleaginous plants, such as sunflowers, cereals, such as wheat, corn or oats, legumes, such as garden peas, after the normally utilized product, such as sugar, fruit juice, pectin, oil, starch, flour, had been extracted by known means.

These pulps, the so-called extracted pulps, which constitute the basic vegetable matter for which the process of the invention is intended, are designated hereafter by the single term of pulp, without any further definition.

They are characterized by a high food fiber content as determined by the known enzymatic method.

They may be used in industry for the preparation of food products, for example cereals. But the commercial development of these products unfortunately is frequently hindered by excessive coloration.

To improve this condition, it has been proposed to subject the pulps to the action of hydrogen peroxide in an alkaline aqueous solution, such as that proposed for example in U.S. Pat. No. 4,241,093.

The process described in this patent, as do more generally all of the known processes of the prior art, include in the action of hydrogen peroxide the elimination of the bleaching solution from the pulp prior to drying it. This elimination is conventionally carried out by washing the pulp, combining the operations of dilution by rinsing with water and concentration by pressing. Among others, this washing has the disadvantage of causing an appreciable loss of vegetable matter and/or the generation of effluents polluted by organic matter.

According to the known method, the pulp is always exposed following the elimination of the hydrogen peroxide to drying, of which it is known that it is usually carried out by the evaporation of water by contacting the pulp for a brief instant with a gaseous atmosphere, which generally is water vapor at elevated temperatures.

This drying is carried out in a manner such that the temperature to which the pulp is heated does not cause harmful degradation of the vegetable manner.

The conditions in which drying is effected are such that the water eliminated from the pulp remains in the state of water vapor in the gaseous atmosphere in contact with the pulp, it being a drying atmosphere.

The drying process defined in this fashion is hereafter designated by the sole term of drying.

Concerning sugar beets, the obtention of the extracted pulp, washing together with the problems it causes and the constraints it imposes and its drying are described for example in "Sucrerie Francaise", October 1985, 439–454.

A dry pulp is defined hereafter, unless indicated otherwise, as a pulp with a water content normally not exceeding about 10 to 11% by weight after drying.

It is known that after carrying out the bleaching and washing of the pulp in the known manner prior to drying, the whiteness of the pulp after drying is often much less than before drying.

Therefore, the known processes are poorly suited to the preparation of pulps that are both dry and sufficiently bleached.

The process of the present invention does not have the disadvantages of the known processes, as it simplifies the flow diagram to obtain dried pulps with a high degree of whiteness for the technical field concerned.

The present invention consists of a process for the preparation of bleached and dried pulps wherein bleaching is carried out by means of hydrogen peroxide and drying by vaporizing the water of the pulp by means of a dry gaseous atmosphere circulating in contact with the pulp, characterized in that bleaching is carried out simultaneously with the drying.

This result is achieved without having to eliminate any solid or liquid material from the pulp from the onset to the completion of the simultaneous bleaching and drying process.

As a consequence, a weight yield relative to dry matter practically equal to 100% is assured, while the known method provides a yield only of the order of 80% for the pulp of beets and 60 to 40% for fruit pulp. In view of the simultaneous bleaching and drying process, no effluents polluted by organic matter is generated, in contrast to the known processes.

All that has been set forth above relative to drying alone is also valid for simultaneous bleaching and drying process of the invention, concerning in particular the choice of parameters so as not to degrade the pulp or the fact that the water eliminated from the pulp by vaporization remains in the form of water vapor in the dry gaseous atmosphere. Air, an inert gas such as nitrogen or dry water vapor are used most often to constitute said gaseous atmosphere.

Dry water vapor is normally preferred for reasons of convenience, cost and safety.

The temperature of the gaseous atmosphere is most frequently between 20° C. and 250° C. and is determined as a function of the drying capacity of the type of atmosphere selected.

If dry water vapor is used, the temperature may for example be between about 150° C. and 250° C., and within this limit is preferably equal to or higher than 200° C.

The pressure of the gaseous atmosphere must obviously be lower than the pressure of the saturating water vapor at the temperature of the gaseous phase. It is generally between about 0.8 bar and 4 bars, absolute.

The duration of the simultaneous bleaching and drying normally does not exceed that of drying when carried out by itself. The process of the invention thus has a clear advantage relative to productivity compared to the known processes. This duration obviously varies from case to case as a function of the nature of the pulp and the choice of the other parameters. It may be short and may not exceed a few seconds if the temperature of the gaseous phase is sufficiently high, for example higher than 150° C. It is generally less than about 10 h. It is normally sufficient to insure the practically complete consumption of the hydrogen peroxide used or at least about 95% of it.

At the completion of the simultaneous bleaching-drying process, the pulp is separated from the gaseous atmosphere for example by means of a cyclone.

A bleached pulp is designated dry if it contains less than 10 to 11% water by weight.

The pH of the pulp at the completion of the simultaneous bleaching and drying process is between approximately 4 and 8.

This preferred pH is more precisely between about 5 and 7 for the pulp of beets and fruit pulp and between about 6 to 8 for cereals such as wheat or corn.

The pH is measured here and in what follows in a suspension of the pulp containing 3.5 to 4.5% by weight of dry matter. The term consistency is defined here and in what follows as the dry matter content expressed in % by weight.

The pulp resulting from the process of the invention is strongly deodorized relative to that resulting from a known process.

The quantity of the hydrogen peroxide counted as 100%, that is introduced with the pulp in the simultaneous bleaching-drying process as well as all other products in what follows except as indicated otherwise, is expressed in weight % relative to the vegetable matter in the dry state, and generally does not exceed about 15%. The preferred quantity varies with the particular case and is preferably between 1 and 10%.

For the simultaneous bleaching and drying, the different products may be added to the pulp at the same time with the hydrogen peroxide or separately. Examples include agents complexing or sequestering metallic ions, such as sodium tripolyphosphate, derivatives of pyrophosphoric or polyphosphoric acids, and citric acid, agents stabilizing the hydrogen peroxide, such as sodium carbonate, sodium benzoate, and sodium acetate.

Alkaline agents are added to certain pulps if their initial pH is too acidic.

The action of the complexing or sequestering agents may take place in an operation distinct from the simultaneous bleaching and drying, with said agents optionally being separated by washing upon the completion of their action prior to the simultaneous bleaching and drying.

The products stabilizing the hydrogen peroxide may include for example sodium silicate or magnesium compounds. The first is conveniently used in the form of a commercial solution of a density equal to 1.33 or 36° C., the quantity of which normally does not exceed 6% and most often is used in quantities between 2 and 5%, as in the case of the pulp of beets. Magnesium is used for example in the form of magnesia or magnesium hydroxide and the quantity of magnesium used is generally between 0.01 and 0.5%.

The bleaching liquid, which consists of an aqueous solution of hydrogen peroxide and optionally products accompanying it, is mixed with the pulp in a manner such that at the onset of the simultaneous bleaching and drying the consistency is equal to at least 10% and preferentially is between 20 and 35% for beets pulp. The mixture is normally carried out at a temperature close to that of the pulp at the moment and may be between the ambient temperature and about 90° C., most often between 60° and 80° C., for example in the case of the pulp of beets. The mixture may be carried out for example by means of a high density mixer known in the paper pulp industry or a machine of the type described for example in FR 2 319 737, 2 418 295, 2 451 963, 2 436 844.

The mixture may also be carried out by spraying the bleaching liquor onto the pulp prior to the simultaneous bleaching and drying.

The bleaching liquor may also be mixed to a pulp of low consistency, for example between about 5 and 10%, at a temperature between the ambient and about 90° C., prior to concentrating the pulp to adjust it to the consistency and bleaching liquor content desired for the simultaneous bleaching and drying, i.e. the state chosen for the simultaneous bleaching and drying.

The mixture of the hydrogen peroxide with the pulp prior to concentration may be carried out in this case for example by means of a mixer of a conventional type or a mixer known as a mixer-disperser or a centrifugal pump.

The different possibilities of the mixing of the bleaching liquid with the pulp may be combined with each other.

Finally, the pulp may be subjected in a known manner to bleaching, followed or not by washing, prior to the simultaneous bleaching and drying of the invention.

The apparatus wherein the simultaneous bleaching and drying is carried out is that known to be suitable for drying only by a known process, for example a drum dryer, a fluidized bed or steam.

The following examples, given as indications and not limitations, illustrate the present invention and make it possible to appreciate its importance relative the known methods.

The degree of whiteness of the pulp is measured on a tablet of the pulp sintered under pressure and is expressed in ISO degrees according to the standard of the paper industry.

The quantities of the product and its consistency are defined in the manner indicated above. The bleached and dried pulp contained 0 to 10–11% water by weight as already mentioned.

The drying and the simultaneous bleaching and drying in Examples 1 to 13 is carried out under atmospheric pressure.

EXAMPLE 1

To a pulp of beets with a consistency of 28% and containing 4.1 g dry matter, a quantity of hydrogen peroxide equal to 10% and water are added, so that its consistency will be 20%, whereupon the pulp is subjected for 4.5 min to a simultaneous bleaching and drying, in which drying is carried out by dry steam at a temperature between 240° and 245° C., which circulates in contact with the pulp.

More than 95% of the hydrogen peroxide used are consumed in the simultaneous bleaching and drying, at the completion of which the bleached and dried pulp has a weight of 4.1 g, a water content less than 1% by weight, a pH of 4.6 and a whiteness degree equal to 39° ISO.

The same initial pulp, adjusted to a consistency of 20% by the addition of water only without the addition of hydrogen peroxide, is dried as above. After drying, its whiteness is equal to 23° ISO.

EXAMPLE 2

The simultaneous bleaching and drying of Example 1 is repeated with the difference that the hydrogen peroxide is accompanied by a quantity of sodium silicate of 4%.

4.2 g of the bleached and dried pulp containing less than 1% water by weight, is obtained.

The bleached and dried pulp at this time has a pH equal to 5.6 and a whiteness degree of 41° ISO.

EXAMPLE 3

The same pulp as in Example 1 containing 4.1 g dry matte, adjusted to a consistency of 8% by the addition of water, is exposed to a treatment for 15 min at 80° C. by means of 0.5% of a solution of 40% by weight of the sodium salt of ethylenetriaminepentaacetic acid and then is concentrated by compression to a consistency of 27%, prior to the addition 10% hydrogen peroxide, 4% sodium silicate and water, so as to obtain a consistency of 20%. It is exposed to simultaneous bleaching and drying as in Example 1.

4.4 g of a bleached and dried pulp is obtained; it contains 6% water by weight and its degree of whiteness is 40° ISO.

EXAMPLE 4

Example 1 is repeated with the difference that the quantity of hydrogen peroxide is 5% instead of 10%.

The degree of whiteness of the bleached and dried pulp obtained is 34° ISO.

EXAMPLE 5 (Comparative)

The same pulp as in the preceding examples, containing 4.1 g dry matter and adjusted to a consistency of 8% by means of 5% hydrogen peroxide, 4% sodium silicate, 1.5% sodium hydroxide and 0.5% of a 40% solution of the sodium salt of ethylenetriaminetetracetic acid, prior to bleaching for 1 h at 75° C., then washed and compressed to obtain a pulp with a consistency of 20%, which is then dried with circulating dry steam for 4.5 min at a temperature of 240° to 245° C.

The pulp bleached and dried in this manner has a weight of 4 g, a water content of 6% by weight and a whiteness degree of 24° ISO, which is practically the same as that obtained by drying without bleaching in Example 1.

EXAMPLE 6

Example 5 is reproduced with the difference that the concentration by compression adjusts the pulp to a consistency of 26%, to which subsequently 5% hydrogen peroxide and water are added to obtain a consistency of 20% prior to drying.

After drying, 3.9 g of a bleached and dried pulp containing 4% water by weight, is obtained.

The degree of whiteness of the bleached and dried pulp obtained at the completion of the bleaching-drying treatment of the invention is 37° ISO, i.e. close to that of the pulp subjected to the simultaneous bleaching-drying of the invention in Example 4

EXAMPLE 7

To 4.4 g of raw wheat bran from the separation of the grain containing 4 g dry matter, 10% hydrogen peroxide and water to obtain a consistency of 56% prior to simultaneous bleaching-drying are added during 45 s by means of dry steam at 245° C.

4 g of bleached and dried bran is obtained with a water content of less than 1%, the pH being equal to 6.1 and the degree of whiteness to 28.7° ISO.

The operation is repeated by omitting the addition of hydrogen peroxide. The whiteness degree of the bran obtained is only 10° ISO.

EXAMPLE 8

Example 7 is reproduced by adding hydrogen peroxide, 2% sodium silicate and 0.5% sodium hydroxide.

The dried and bleached bran has a pH of 7.7 and a whiteness of 31.7° ISO.

EXAMPLE 9

To 4.4 g of corn bran or corn husks containing 4 g dry matter, 10% hydrogen peroxide, sodium silicate and water to obtain a consistency of 50%, are added prior to simultaneous bleaching-drying by means of dry steam at 240° C. for 1 min.

4.1 g of bleached and dried corn bran are obtained with a water content of less than 1% by weight and a whiteness degree of 31.3° ISO.

By operating as above but in the absence of hydrogen peroxide and sodium silicate, the degree of whiteness of the dried corn bran is 14° ISO.

EXAMPLE 10

Example 9 is reproduced by replacing the corn bran with apple draff and adding 1% sodium hydroxide in addition to the hydrogen peroxide and sodium silicate.

The degree of whiteness after simultaneous bleaching-drying is 15.3° ISO.

By proceeding as above but in the absence of all reagents, the whiteness degree is only 6.8° ISO.

EXAMPLE 11

Example 9 is reproduced by replacing the corn bran by citrus pulp and carrying out simultaneous bleaching-drying for 40 s by means of dry steam at 245° C.

The degree of whiteness of the bleached and dried pulp is 17.8° ISO.

By proceeding as above but in the absence of hydrogen peroxide and sodium silicate the degree of whiteness is only 8.6° ISO.

EXAMPLE 12

To the apple pulp, called apple draff, containing 4 g dry matter, 10% hydrogen peroxide, 4% sodium silicate, 4% sodium hydroxide and water to obtain a consistency of 30% prior to simultaneous bleaching and drying by means of dry air at 90° C., are added.

The bleached and dried pulp has a pH of 5 and a whiteness degree of 33° ISO.

By proceeding as above but in the absence of hydrogen peroxide, sodium silicate and sodium hydroxide the degree of whiteness is only 14.4° ISO.

EXAMPLE 13

Example 12 is repeated with citrus pulp with the exception that the consistency is 20% in place of 30%.

The bleached and dried pulp has a pH equal to 6 and a whiteness degree of 30.8° ISO.

By operating as above but in the absence of reagents, whiteness is equal to 16.3° ISO., while the initial whiteness of the pulp is 19.7° ISO.

I claim:

1. Process for the preparation of bleached and dried vegetable pulps comprising bleaching vegetable pulp with hydrogen peroxide and simultaneously drying said vegetable pulp by vaporizing the water in the pulp by means of a dry gaseous atmosphere circulating in contact with said pulp.

2. Process according to claim 1, wherein the quantity of said hydrogen peroxide added to the pulp to be bleached and dried simultaneously does not exceed about 15% by weight relative to the weight of the vegetable matter in the dry state.

3. Process according to claim 2, wherein said quantity of hydrogen peroxide is between about 1 and 10%.

4. Process according to claim 1, wherein one or several agents for stabilizing the hydrogen peroxide are added to the pulp to be bleached and dried simultaneously.

5. Process according to claim 1, wherein said stabilizing agent is sodium silicate.

6. Process according to claim 5, wherein the quantity of sodium silicate does not exceed 6% by weight relative to the weight of the vegetable matter in the dry state.

7. Process according to claim 6, wherein said quantity of sodium silicate is between 2 and 5%.

8. Process according to claim 1, wherein said agent for stabilizing the hydrogen peroxide is a magnesium compound.

9. Process according to claim 8, wherein said magnesium compound is chosen from among magnesia and magnesium hydroxide.

10. Process according to claim 9, wherein the quantity of said magnesium compound used is between 0.01 and 0.5%.

11. Process according to claim 1, further comprising adding agents complexing or sequestering metallic ions to the pulp to be bleached and dried simultaneously.

12. Process according to claim 11, wherein said complexing or sequestering agents are sodium tripolyphosphate, derivatives of pyrophosphoric or polyphosphoric acids, or citric acid.

13. Process according to claim 1, further comprising adding alkaline agents to the pulp to be bleached and dried simultaneously.

14. Process according to claim 13, wherein said alkaline agent is sodium hydroxide, sodium carbonate or sodium benzoate.

15. Process according to claim 1, wherein said dry gaseous atmosphere is air, an inert gas or water vapor.

16. Process according to claim 15, wherein said inert gas is nitrogen.

17. Process according to claim 15, wherein the temperature of the dry gaseous atmosphere is from about 20° to 250° C.

18. Process according to claim 17, wherein said gaseous atmosphere is steam at a temperature of from about 150° to 250° C.

19. Process according to claim 18, wherein said temperature of the steam ranges from about 200° C. to 250° C.

20. Process according to claim 1, wherein the pH of the pulp simultaneously bleached and dried is between approximately 4 and 8.

21. Process according to claim 20, wherein said pH is between approximately 5 and 7 and the pulp to be bleached and dried simultaneously is the pulp of beets or fruit.

22. Process according to claim 20, wherein said pH is between approximately 6 and 8 and the pulp to be bleached and dried simultaneously is a cereal bran.

23. Process according to claim 1, wherein the consistency of the pulp subjected to simultaneous bleaching and drying is at least 10%.

24. Process according to claim 23, wherein said consistency is between about 20 and 35%.

25. Process according to claim 1, wherein said hydrogen peroxide, together with the other products to be added with it, are added to a pulp with a consistency not exceeding 10% and further comprising adjusting the concentration to the state chosen for its simultaneous bleaching and drying.

26. Process according to claim 25, wherein said consistency of the pulp to which hydrogen peroxide is added is between about 5 and 10%.

27. Process according to claim 1, wherein the duration during which the pulp is simultaneously bleached and dried is such that at least 95% of the hydrogen peroxide added is consumed.

28. Process according to claim 1, wherein the pressure of the dry gaseous atmosphere is between about 0.8 bar and 4 bars, absolute.

* * * * *